Dec. 31, 1963 R. L. JONES 3,116,235
STRIPPING RICH ABSORPTION OIL
Filed May 16, 1961
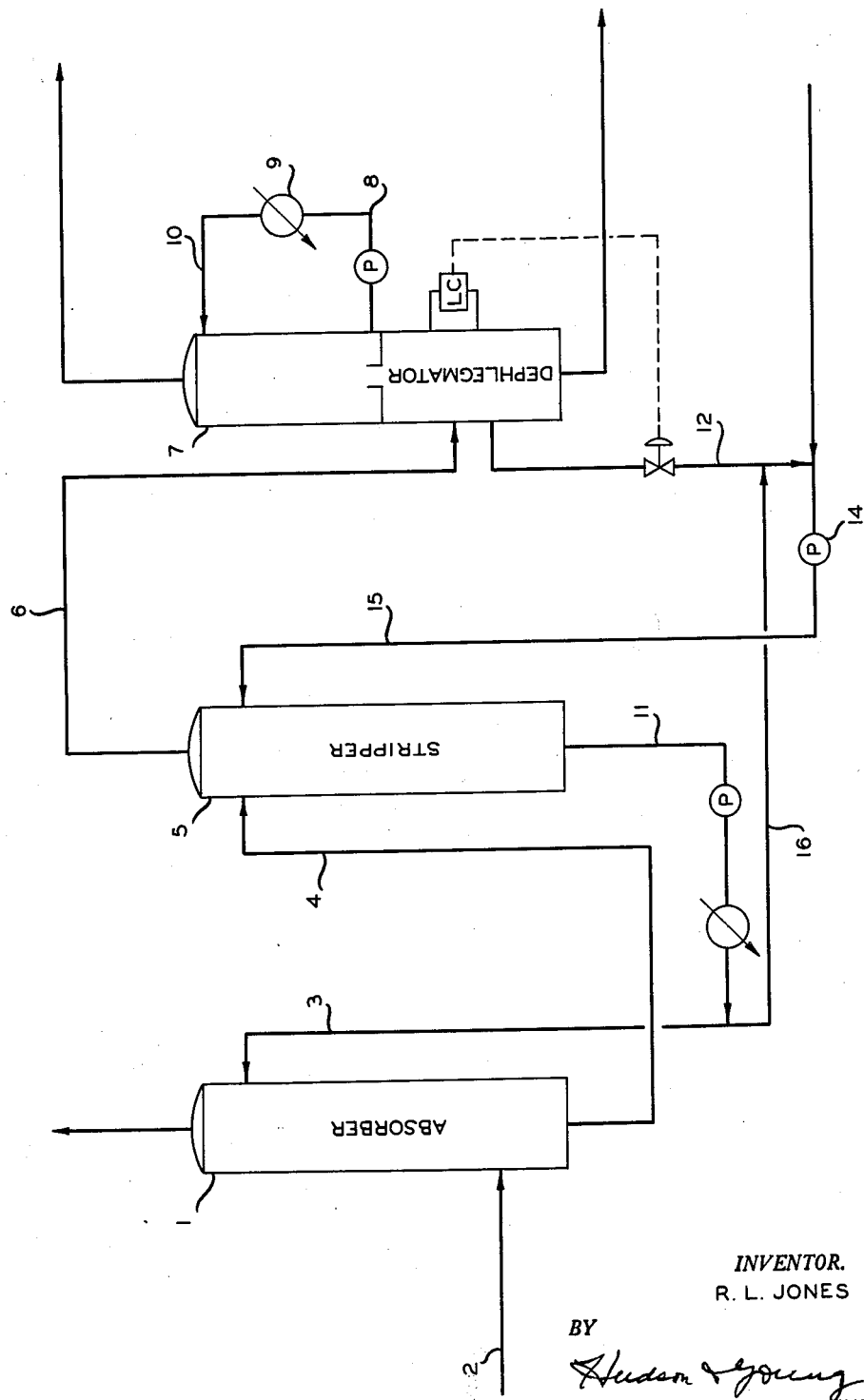
INVENTOR.
R. L. JONES
BY
Hudson & Young
ATTORNEYS

United States Patent Office 3,116,235
Patented Dec. 31, 1963

3,116,235
STRIPPING RICH ABSORPTION OIL
Robert L. Jones, Lindsay, Okla., assignor to Phillips
Petroleum Company, a corporation of Delaware
Filed May 16, 1961, Ser. No. 110,435
1 Claim. (Cl. 208—341)

This invention relates to a method and apparatus for the purification of absorption oils. More particularly, this invention relates to a method and apparatus for continuous separation of absorption oils. One aspect of this invention relates to improved method and apparatus for pumping liquid and vapor mixtures. Another aspect of this invention relates to the providing of a vapor-lock free stripping operation. Still another aspect of this invention relates to reducing suction loss in pumps. A still further aspect of this invention relates to a method and apparatus for reducing vapor pressure of liquid hydrocarbons.

In the operation of a gasoline plant, natural gas is contacted with lean oil for the absorption of gasoline. The gasoline is stripped from the oil and the vapors are passed into a dephlegmator. Water is used as reflux in the dephlegmator to condense the lean oil that is carried with the vapors from the stripper. It is difficult to pump this condensed lean oil from the dephlegmator to the stripper because of the high vapor pressure of the condensed lean oil which is saturated with gasoline. The pumps that are used for forcing the condensed oil into the stripper often lose suction and, in other words, become vapor-locked.

An object of this invention is to provide a continuous stripping operation. Another object of this invention is to provide a continuous stripping operation which is free from vapor-locked pumps. A still further object of this invention is to prevent the vapor-locking of pumps in a fluid separating process.

Other aspects, objects and the several advantages of this invention will be apparent from a study of this disclosure, the drawing and the appended claims.

I have now found that, by the addition of lean oil to the condensed oil from the dephlegmator, just before the condensed oil enters the pump which forces it into the carrier, there is thus provided a continuous suction and thus a continuous stream is allowed to be fed into the stripper. In particular, a small addition of 2–5 percent of lean oil added to the condensed oil will lower the vapor pressure of the oil sufficiently that the pump will pick up the combined stream of oil.

The drawing is a diagrammatic view of this invention.

The invention may be better understood by referring to the drawing. Natral gas enters absorber 1 through line 2. Lean oil enters absorber 1 through line 3. The lean oil absorbs natural gasoline while passing countercurrently down through absorber 1. The rich oil formed in absorber 1 passes through line 4 and into stripper 5. Natural gasoline is stripped from the rich oil and passes through line 6 and into dephlegmator 7. Water is recirculated from dephlegmator 7 through line 8, cooled in heat exchanger 9 and added back into the dephlegmator through line 10. The stripped oil from stripper 5 passes through line 11 and is pumped through line 3. Most of this lean oil is passed back into absorber 1.

In dephlegmator 7, lean oil is condensed and passed through line 12, picked up by pump 14 and passed through line 15 back into stripper 5. A small fraction of the lean oil from line 3 is passed through line 16 into the suction of pump 14. This lean oil reduces the vapor pressure of the mixture of lean oil and condensed oil from line 12 so that it can be picked up by pump 14. It has been found that, when lean oil is added to the condensed oil to the extent that the combined oils contain from 2–8 percent lean oil, pump 14 will take suction. During hot weather, it is necessary to add more lean oil than during cool weather. If the atmospheric temperature is extremely low, it may be possible to cut the flow of oil passing through line 16 below 2 percent and, in some cases, even do without oil passing through line 16.

The following example is presented to illustrate the concept of the present invention and is not limiting thereto.

*Example*

In providing separation of the constituent hydrocarbons, gas is passed through line 2 at the rate of 100MM s.c.f.d. Lean oil is passed into absorber 1 at the rate of 2.5 MM g.p.d. Gasoline vapors stripped from the rich oil in stripper 5 are passed through line 6 at the rate of 3.5MM s.c.f.d. The dephlegmator is operated at 190° F. overhead temperature and 270° F. bottom temperature and a pressure of 70 p.s.i.g. Condensed oil is passed through line 12 at a rate of 80 g.p.m. Lean oil is passed through line 16 into line 12 at a rate of about 6 g.p.m. and returned to stripped 5 for further utilization.

If desired, the rich oil used to power jet pump 14 may be a part of the rich oil drawn from absorber 1.

The rate of flow of the lean oil into line 12 may vary from 2–15 g.p.m. The rate of flow through line 16 will vary with the temperature of operation of dephlegmator 7. The lower the bottom temperature in dephlegmator 7, the higher will be the concentration of low boiling constituents passing through line 12. The higher the concentration of low boiling constituents passing through line 12, the greater the rate of flow of lean oil through line 16. The lower the temperature of the oil passing through line 16, the less oil required to be added to line 12. Instead of using jet pump 14, powered by rich oil from absorber 1, a centrifugal or reciprocating pump may be substituted for jet pump 14. There may also be a rate of flow controller on the oil line that feeds rich oil into jet pump 14 for supplying power to the pump. Usually the pressure in absorber 1 is high enough that it is unnecessary to use the pump to increase the pressure of either the rich oil flowing through line 4 or the rich oil used to power jet pump 14. Rich oil for powering jet pump 14 flows at the rate of 320 g.p.m.

Reasonable variation and modification are possible within the scope of the foregoing disclosure, the drawing and the appended claim to the invention, the essence of which is that there are provided method and apparatus for preventing the vapor-locking of pumps in a fluid separation process by the addition of a lean hydrocarbon to the hydrocarbon content in a dephlegmator.

I claim:

In the operation of a natural gasoline plant wherein gasoline is obtained by a process comprising contacting the gas with the lean oil so as to absorb the gasoline therefrom, stripping the thus enriched lean oil of said gasoline by passing same through a stripping zone, condensing the vapors from said stripping zone by passing same through a dephlegmating zone, recovering said gasoline from said dephlegmating zone and recycling by pumping to said stripping zone condensed enriched lean oil from said dephlegmating zone, the improvement which comprises adding lean oil to said condensed enriched lean oil at a point prior to pumping same so as to prevent vapor lock therein.

References Cited in the file of this patent

UNITED STATES PATENTS 2,727,588    Woertz _____ Dec. 20, 1955

OTHER REFERENCES

Guthrie: Petroleum Products Handbook, 1st ed., McGraw-Hill, New York, 1960, pp. 4–27, 4–28.

Petroleum Handbook, Royal Dutch/Shell Group, 4th ed., Shell International Petroleum Co., Ltd., London, 1959, pp. 438–9.